Oct. 16, 1928.
H. C. BURKHARD
SUPPORT FOR REMOVABLE SEAT COVERS
Filed Feb. 19, 1927
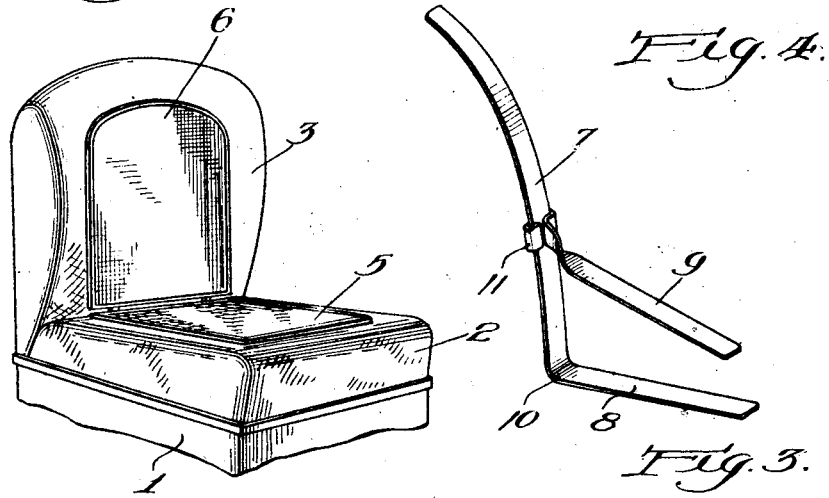
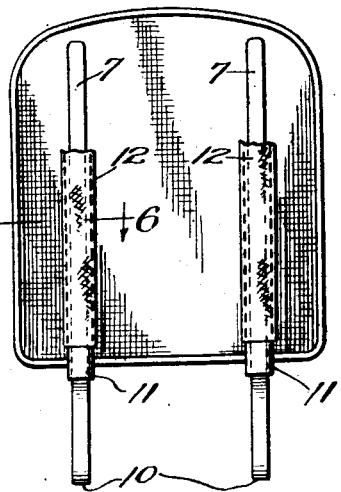
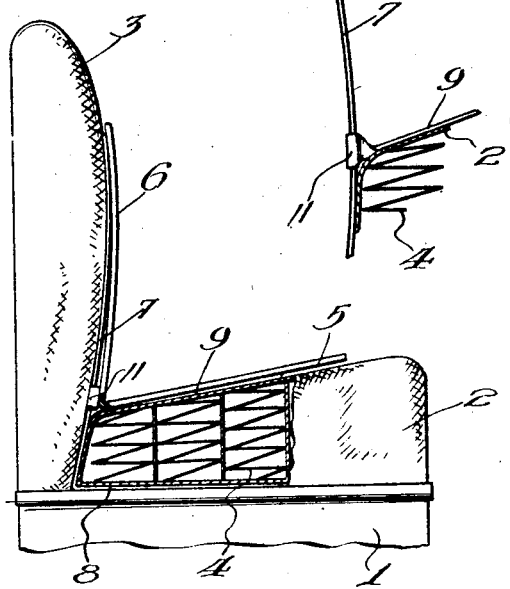

Patented Oct. 16, 1928.

1,687,826

UNITED STATES PATENT OFFICE.

HAROLD C. BURKHARD, OF CHICAGO, ILLINOIS.

SUPPORT FOR REMOVABLE SEAT COVERS.

Application filed February 19, 1927. Serial No. 169,566.

The present improvements relate more particularly to a supporting structure adapted to be utilized in combination with removable seat and back covers.

The present invention is more particularly applicable to those types of seat and back covers or pads in common use in motor vehicles.

The object of the invention is to provide a simple, inexpensive and effective device to be utilized in combination with seat and back covers to prevent accidental displacement, slipping, and collapsing of the covers when not in use.

At the present time, relatively inexpensive flexible covers or pads enjoy wide usage to cover the backs and seats of motor vehicles. The purpose of these covers is two-fold; first, to protect the covering of the seat and back from wear, thus prolonging its life, and secondly, to protect and minimize soiling of wearing apparel. These covers generally take the form of two sections, one for the seat and one for the back, connected at an intermediate point. It has been found in practice that these covers even when in use have a tendency to accidentally displace and slip, thus decreasing their efficiency. This accidental displacement and slipping is particularly noticeable when a person arises from a seat on which said covers have been placed. Frequently the back cover collapses and falls on the seat, and frequently the entire assembly falls to the floor of the motor vehicle, and at times falls out of the car.

The purpose of the present invention is to provide a device to be utilized in combination with these seat and back covers, whereby they can be mounted in a fixed definite position and prevented from accidental displacement or slipping, whether they are in actual use or not.

Other objects and advantages will be more apparent from the following description:

In the drawings, Fig. 1 is a perspective view illustrating a seat and back, with the seat and back cover supported according to the present invention.

Fig. 2 is a view similar to Fig. 1 except that the view is a side elevational view, and part of the seat cushion has been broken away and illustrated in vertical section.

Fig. 3 is a rear elevational view illustrating the supporting structure for the back cover.

Fig. 4 is a perspective view of the support per se.

Fig. 5 is a fragmentary detail of the supporting structure shown in Fig. 4.

Fig. 6 is a cross sectional view taken on line 6—6 of Fig. 3.

Referring more in detail to the drawings, 1 designates a suitable support on which is removably mounted the seat 2 and associated back 3. The seat 2 and back 3 may be of the cushion type, if desired, the springs 4 being utilized for resilience.

A seat cover 5 and back cover 6 are adapted to be placed, respectively, on the seat 2 and back 3. The seat cover 5 and back cover 6 preferably comprise connected sections of suitable flexible material, such as, for instance, woven fiber, cloth, or the like. In order to secure efficiency in use, it is desirable that the seat and back covers remain in placed position, and be prevented from any accidental displacement or slippage. To accomplish this, I provide a supporting structure to be utilized in combination with the seat and back cover, which supporting structure comprises an upright member 7 from the base of which projects a seat engaging element 8 and a seat cover engaging element 9. The upright 7 and projection 8 may be formed, as illustrated in Fig. 4, from one continuous strip of ribbon steel, being bent at the point 10 to substantial L-shape, or these two elements may be made in two separate pieces if desired. The element 9, through the medium of the portion 11, is adapted to have a sliding adjustable engagement relative to the upright 7. As a feature of the present invention, this upright 7 is slightly curved to conform to the curvature of the back 3, as illustrated more particularly in Fig. 2.

I have found it preferable to employ two of these supporting structures with each seat and back cover, but it is to be understood that one or more than two may be advantageously utilized within the contemplation of the invention. In use and operation the back of the seat cover is provided with an elongated slot formed by attaching the tape 12 to the back of said back cover 6. The uprights 7 are adapted to be inserted in said elongated slots and attached to the back cover 6 by means of the tapes 12.

In use and operation, the projection 8 is adapted to be positioned below the seat 2, as illustrated in Fig. 2, while the projection 9 is adapted to engage under the seat cover 5. It may be pointed out here that the projections 9 may or may not have an attachment with the seat cover 5 similar to the attachment between the back cover 6 and uprights 7.

It is to be noted, from the illustration in Fig. 2, that as weight is applied to the upper surface of the cover 5 and projection 9 that the connection 11 will act under the spring tension of the blade steel used as a fulcrum to lock the entire assembly in place, causing the upright 7 to snugly fit the contour of the back 3.

When it is desired to remove the support, it is only necessary to remove the seat 2, and the entire assembly can be very easily disassembled.

The invention is characterized by its extreme simplicity, economy in manufacture, utility in use and ease in assembly and disassembly. The importance of the self locking feature of the device will be apparent to those skilled in this art.

It is obvious, of course, that the material used may be either spring steel, or any similar material. The support can be used in connection with any type of seat cover where it is desired to hold up the back of the seat protector and protect its accidental displacement.

It is obvious that in some cases the projecting element 9 may be dispensed with, but in the preferred use of the invention it is desirable because of the spring tension exerted by it when pressure is applied to it to cause the upright to hug the contour of the back 3.

I claim as my invention:

1. In combination with a seat and back therefor, a covering comprising sections of suitable material adapted to overlie respectively the seat and back, a support for said covering comprising an upright adapted to cooperatively engage the back covering and the back, and elements spaced relative to each other projecting from said upright and adapted to cooperatively engage the seat cover and seat, the element engaging the seat covering being slidably adjustable relative to the upright.

2. In combination with a seat and back therefor, a covering comprising sections of suitable material adapted to overlie respectively the seat and back, a support for said covering comprising an upright adapted to cooperatively engage the back covering and the back, and elements spaced relative to each other projecting from said upright and adapted to cooperatively engage the seat cover and seat, a slidable sleeve having cooperative engagement, respectively, with said upright and the extension engaging the seat covering to permit the element engaging the seat covering to be adjustable relative to the upright, the upright and projecting elements being formed of spring metal, whereby, when in use, pressure applied to the seat cover and protecting element therefor, will cause the sleeve to lock the entire assembly.

HAROLD C. BURKHARD.